US011243777B2

(12) United States Patent
Delprat et al.

(10) Patent No.: US 11,243,777 B2
(45) Date of Patent: Feb. 8, 2022

(54) PROCESS STREAM REPLICATION FOR CONTENT MANAGEMENT SYSTEM SYNCHRONIZATION

(71) Applicant: Nuxeo Corporation, Brooklyn, NY (US)

(72) Inventors: Thierry Delprat, Brooklyn, NY (US); Damien Metzler, Irvine, CA (US); Benoit Delbosc, Paris (FR)

(73) Assignee: NUXEO CORPORATION, Brooklyn, NY (US)

( * ) Notice: Subject to any disclaimer, the term of this patent is extended or adjusted under 35 U.S.C. 154(b) by 0 days.

(21) Appl. No.: 15/983,970

(22) Filed: May 18, 2018

(65) Prior Publication Data

US 2019/0354376 A1  Nov. 21, 2019

(51) Int. Cl.
*G06F 9/38* (2018.01)
*G06F 9/54* (2006.01)
*G06F 16/25* (2019.01)
*G06F 16/27* (2019.01)

(52) U.S. Cl.
CPC ............ *G06F 9/3869* (2013.01); *G06F 9/546* (2013.01); *G06F 16/25* (2019.01); *G06F 16/27* (2019.01)

(58) Field of Classification Search
CPC .. G06F 9/3869; G06F 9/546; G06F 17/30557; G06F 17/30575; G06F 16/27; G06F 16/25
See application file for complete search history.

(56) References Cited

U.S. PATENT DOCUMENTS

| | | | | |
|---|---|---|---|---|
| 6,675,190 B1* | 1/2004 | Schabernack | ......... | G06F 9/4881 718/102 |
| 7,346,910 B1* | 3/2008 | Ahern | ..................... | G06F 9/468 719/314 |
| 8,296,410 B1* | 10/2012 | Myhill | ................ | G06F 11/1451 709/223 |
| 9,063,980 B2* | 6/2015 | Dhamankar | ...... | G06F 16/24556 |
| 9,251,164 B2* | 2/2016 | Doshi | ..................... | G06F 16/14 |
| 9,697,484 B1* | 7/2017 | Mohen | .................. | G06F 16/214 |
| 2007/0083569 A1* | 4/2007 | Wong | .................. | G06F 16/2365 |
| 2007/0233953 A1* | 10/2007 | Shen | .................... | G06F 11/2038 711/114 |
| 2008/0034014 A1* | 2/2008 | Beck | ........................ | G06F 16/27 |
| 2008/0154900 A1* | 6/2008 | Matsumoto | ......... | G06F 16/2308 |
| 2008/0285507 A1* | 11/2008 | Mukherjee | ........ | H04W 72/1278 370/329 |
| 2009/0313311 A1* | 12/2009 | Hoffmann | ........... | G06F 11/2097 |
| 2010/0250511 A1* | 9/2010 | Wurzer | ................ | G06F 16/951 707/706 |
| 2012/0054533 A1* | 3/2012 | Shi | ....................... | G06F 11/2097 714/4.1 |
| 2012/0278815 A1* | 11/2012 | Balko | .............. | G06Q 10/06316 719/313 |

(Continued)

*Primary Examiner* — Ashish Thomas
*Assistant Examiner* — Abdullah A Daud
(74) *Attorney, Agent, or Firm* — Kacvinsky Daisak Bluni PLLC (57) ABSTRACT

Described is a content management system (CMS) where a primary CMS is arranged to provide a command pipeline along with associated timing information while an alternative CMS is arranged to replay the commands from the command pipeline in an order based on the associated timing information to synchronize the alternative CMS to the primary CMS.

14 Claims, 8 Drawing Sheets

(56) References Cited

U.S. PATENT DOCUMENTS

| | | | |
|---|---|---|---|
| 2013/0024426 A1* | 1/2013 | Flowers | H04L 67/32 707/654 |
| 2014/0068635 A1* | 3/2014 | Holzleitner | G06F 9/546 719/314 |
| 2014/0195550 A1* | 7/2014 | Balakrishnan | G06F 16/64 707/754 |
| 2014/0208340 A1* | 7/2014 | Poornachandran | H04N 21/4751 725/10 |
| 2014/0324773 A1* | 10/2014 | Ding | G06F 16/178 707/610 |
| 2015/0019478 A1* | 1/2015 | Buehne | G06F 16/214 707/609 |
| 2015/0058289 A1* | 2/2015 | Do | G06F 16/2386 707/613 |
| 2015/0149409 A1* | 5/2015 | Lee | G06F 16/27 707/623 |
| 2015/0206537 A1* | 7/2015 | Fusakawa | G10L 17/26 704/249 |
| 2015/0248382 A1* | 9/2015 | Shin | G06F 40/143 715/239 |
| 2016/0212078 A1* | 7/2016 | Smith | H04W 4/50 |
| 2017/0228417 A1* | 8/2017 | Maccanti | G06F 11/1469 |
| 2018/0054303 A1* | 2/2018 | O'Toole | G06F 21/6263 |
| 2019/0005085 A1* | 1/2019 | Nagey | G06F 16/27 |
| 2019/0197173 A1* | 6/2019 | Tahara | H04L 67/1097 |

* cited by examiner

PROCESS STREAM REPLICATION FOR CONTENT MANAGEMENT SYSTEM SYNCHRONIZATION

TECHNICAL FIELD

Embodiments described herein generally relate to content management systems and particularly to synchronizing multiple instances of a content management system.

BACKGROUND

The modern computing era has brought with it a proliferation of digital content. Management and organization of this exponentially increasing amount of digital content is facilitated through content management (CM) systems (CMSs). In general, a CMS can support creation, medication, and/or hosting of different types of digital content.

A CMS is typically implemented on a data center. Data centers are often composed of a number of servers or groups of physical computing resources, that can include processors, memory arrays, storage arrays, networking interconnects, etc. The data center servers and computing resources are often warehoused in a particular location and connected to the users of the CMS through the Internet.

It is often desirable to maintain multiple instances of a CMS on separate data centers, which might be warehoused in different locations. Maintaining multiple instances of a CMS can provide redundancy and backup, for example, to mitigate against loss of networking at the data center, loss of power at the data center, or other disasters (e.g., fire, flooding, earthquake, or the like), each of which could make the data center unavailable to support the CMS.

Maintaining multiple instances of a CMS on separate data centers requires that the instances be kept in synchronization with each other. The present disclosure is directed towards synchronizing instances of a CMS.

DETAILED DESCRIPTION

In general, a CMS manages digital content. A number of types of CMSs are available, such as, for example, a web content management system (WCMS), a digital asset management system (DAMS), a document management system (DMS), enterprise content management (ECM), media asset management (MAM), etc. A CMS typically provides for the creation, modification, management, and/or hosting of multiple types of "digital assets." For example, a CMS could provide for management of documents, images, videos, maps, program code, etc. Additionally, for each of the various asset types, the CMS can provide format management, versioning, history, indexing, searching, retrieval, etc. Furthermore, these digital assets and associated records may be stored within multiple databases, which may be different types of databases or be provided according to different database structures and formatting.

As noted above, it may be desirable to provide multiple instances of a CMS to provide for redundancy and system backup. With some examples, depicted herein, each instance of the CMS may be deployed at a different data center. Due to the volume of data managed by a modern CMS and due to the number of underlying systems employed within the CMS, conventional synchronization techniques cannot be implemented. For example, straight replication or mirroring techniques cannot be implemented due to the amount of bandwidth required to copy an entire CMS instance across data centers. Furthermore, latency between the CMS deployments often prevents synchronously executing each operation on the multiple CMS deployments. As another example, the need to maintain consistency throughout the CMS prevents asynchronous execution of each operation on the multiple CMS deployments (e.g., due to multi-threaded operations, or the like). As another example, synchronization based on transaction logs is unreliable due to the number of different underlying systems implemented within the CMS. More specifically, a single database within a CMS could be synchronized based on the transaction log for the database. However, consistency throughout the entire CMS cannot be ensured as the synchronization stays within the database and does not extend to the other sub-systems of the CMS. For example, large files are typically not stored within the database due to compatibility issues. Likewise, audit logs are typically not stored within the database due to query speed at scale. As such, merely synchronizing the database would not ensure consistency across the CMS deployments.

The present disclosure provides a CMS arranged to synchronize a primary CMS implementation with a number of alternative CMS implementations where operations (e.g., read, write, move, copy, modify, etc.) executed on the primary CMS implementation are "replayed" on the alternative CMS implementations to synchronize the implementations with each other. In some examples, each underlying sub-system of the CMS provides a process queue along with a timestamp associated with each action from the queue. The actions from each queue are replayed on the alternative CMS, in order based on the time stamps, to synchronize the alternative CMS with the primary CMS. Thus, where one of the alternative CMS implementations becomes the primary CMS implementation (e.g., due to failure of the primary CMS implementation, or the like) the alternative CMS implementation will be in sync with the primary CMS implementation and management of the digital assets may proceed without interruption, or without a significant interruption.

Figure 1:
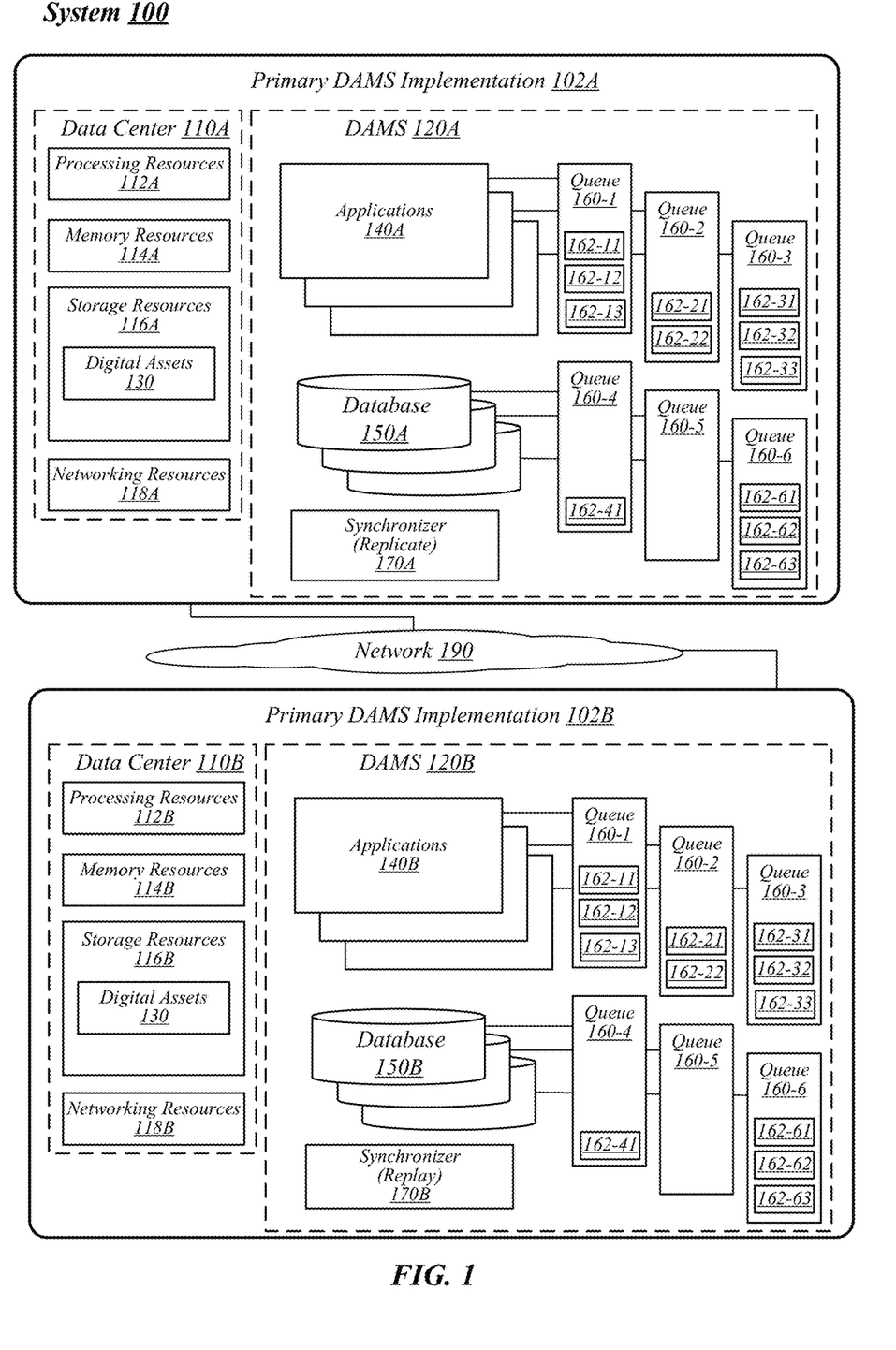
FIG. 1 illustrates an example system including multiple DAMS deployments.

FIG. 1 illustrates a conceptual overview of a system 100 that may generally be representative of multiple implementations of a DAMS deployed across different data centers, in/for which one or more techniques described herein may be implemented according to various embodiments. It is noted that although this figure depicts and describes a DAMS, the present disclosure, including the techniques to synchronize instances of a DAMS can be implemented on any type or configuration of CMS (e.g., ECM, MAM, DMS, WCMS, or the like). Examples are not limited in this context.

As depicted, system 100 contains a number of data centers 110, communicatively coupled via a network 190. Network 190 can be any network arranged to provide for the exchange of data between data centers, such as, the Internet.

Each of data centers 110 contains a number of physical computing resources, such as, processing resources 112, memory resources 114, storage resources 116, and networking resources 118. At each data center 110, these physical resources (or portions of these physical resources) are grouped and allocated to support a DAMS 120. Said differently, DAMS 120 is deployed on and executed by the physical computing resources of a data center 110.

In the particular non-limiting example depicted in FIG. 1, system 100 contains a primary DAMS implementation 102A that includes DAMS 120A deployed on data center 110A. The system 100 further includes an alternative DAMS implementation 102B that includes DAMS 120B deployed on data center 110B. Data centers 110A and 110B each include respective ones of processing resources 112A/112B, memory resources 114A/114B, storage resources 116A/116B, and networking resources 118A/118B. Primary DAMS implementation 102A is communicatively coupled to alternative DAMS implementation 102B via network 190 (e.g., through networking resources 118A and 118B, or the like). It is noted, system 100 could include multiple alternative DAMS instances, each coupled to primary DAMS 102A and arranged to synchronize to primary DAMS 120A, as detailed herein. However, for purposes of clarity and not limitation, this figure depicts a single alternative DAMS implementation.

Generally speaking, DAMS 120 (e.g., primary DAMS 120A) operates to manage digital assets 130. To manage digital assets 130, the DAMS 120 employs a number of sub-systems, such as, applications 140 and databases 150. Applications 140 and databases 150 are employed to manipulate and/or manage digital assets 130. For example, an application 140 could be executed to convert a number of digital assets 130 of a first file type (e.g., .doc, JPG, or the like) to a second file type (e.g., .docx, GIFF, or the like). As another example, a database 150 could be configured to manage versioning, history, metadata and indexing for digital assets 130. As a simple example, the database 150 might store metadata (e.g., author, location, resolution, height, width, or the like) for a picture file of digital assets 130. Examples are not limited in this context and the concepts described herein to synchronize a DAMS deployed on one data center to a DAMS deployed on another data center can be implemented independent from the actual digital assets 130 managed by the DAMS, or independent from the exact number, type, or configuration of the underlying sub-systems (e.g., applications 140, databases 150, etc.) employed by the DAMS to manage the digital assets 130. It is important to note, that the digital assets 130 can include multiple different types of files. Additionally, digital assets 130 can be organized or stored in multiple different storage types, such as, for example, records, binary files, indexes, key/value pairs, etc. Furthermore, the applications 140 and particularly the databases 150 can be provided by multiple different providers, such as, for example, Oracle, PostgreSQL, Elasticsearch, MongoDB, Redis, Kafka, etc.

Each of DAMS 120A and DAMS 120B include respective ones of applications 140A/140B and databases 150A/150B. During operation of DAMS 120A, applications 140A and databases 150A execute a number of actions to create and/or manage digital assets 130. These actions can be organized into queues. For example, queues 160-$n$ each with actions 162-$nm$, where n and m are positive integers, are depicted. With some examples, each of applications 140A and databases 150A has an associated queue 160-$n$, which can include indications of actions 162-$nm$ performed by each of the respective applications 140A or databases 150A. For illustration purposes only, examples of some of the actions 162-$nm$ can be read, write, open, copy, delete, convert, change permissions, update metadata, change binary data, or the like. As a simple example, a DAMS could provide for document management and can provide create, read, update, and delete actions 162-$nm$ relative to the document database. The DAMS could also provide index management and could provide Index, UnIndex, BulkIndex, BulkUnIndex, and configure index actions 162-$nm$ for the index. The DAMS could also provide management of audit logs and could provide add entry actions 162-$nm$ for the audit logs. The DAMS could also provide application level processes, which can be asynchronous, such as, convert, update security, delete, etc.).

In the particular non-limiting example depicted in FIG. 1, system 100 depicts DAMS 120A including queues 160-1, 160-2, 160-3, 160-4, 160-5 and 160-6. Furthermore, each of the queues is depicted having a number of actions. For example, queue 160-1 includes actions 162-11, 162-12 and 162-13; queue 160-2 includes actions 162-211 and 162-22; queue 160-3 includes actions 162-31, 162-32 and 162-33; queue 160-4 includes actions 162-41; queue 160-5 does not include any actions; and queue 160-6 includes actions 162-61, 162-62 and 162-63.

Each of DAMS 120A and 120B includes a synchronizer 170 (e.g., 170A and 170B, respectively) that operates to replicate the queues 160-$n$ and actions 162-$nm$ from DAMS 120A to DAMS 120B and replay the actions 162-$nm$ from DAMS 120A on DAMS 120B to synchronize DAMS 120B to DAMS 120A. For example, DAMS 170A can communicate information elements (e.g., via network 190) including indications of queues 160-$n$ and actions 162-$nm$ such that the actions 162-$nm$ executed on the primary DAMS implementations 102A can be replayed on the alternative DAMS implementation 102B to synchronize DAMS 120B with DAMS 120A. This is explained in greater detail below with reference to FIGS. 2-6. However, it is important to note, that the synchronizers 170A and 170B are arranged to communicate indications about timing of execution of actions 162-$nm$ such that the actions 162-$nm$ can be "replayed" (e.g., executed, or the like) on DAMS 120B in the same order in which they were originally executed on DAMS 120A. It is noted, that the present disclosure provides that actions 162-$nm$ are replayed on the DAMS 120B in the same order as which they were played on the primary DAMS 120A. However, with some examples, a "strict" adherence to the order may not be required. For example, some implementations may provide that data is replicated within main database prior to being put in secondary storage. Said differently, actions 162-$nm$ relative to a data replication on a component of the DAMS (e.g., database 150A-1 of DAMS 120A, or the like) can be played on DAMS 120B prior to the data being migrated or stored in storage 116B.

In general, processing resources 112 (e.g., 112A/112B) can be any hardware or circuitry arrange to execute or process instructions. For example, processing resources 112 could include central processing units, field programmable gate arrays, application specific integrated circuits, graphics processing units, or the like.

Memory resources 114 (e.g., 114A/114B) can include any hardware or circuitry arranged to store data. For example, memory resources 114 can include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), or the like.

Storage resources 116 (e.g., 116A/116B) can include any computer-readable medium arranged to store data. For example, storage resources 116 can include magnetic disks, solid-state disks, optical disks, or the like. It is noted, that either or both of memory resources 114 and storage resources 116 can store instructions, executable by processing resources 112, to cause data center 110 to behave as indicated in the instructions. In some examples, either or both or memory resources 114 and storage resources 116 can non-transitorily store such instructions.

Networking resources 118 (e.g., 118A/118B) can include hardware or circuitry arranged to communicate (e.g., send and/or receive) data or information elements via network 190. In some examples, networking resources 118 can be arranged to send and/or receive information elements (e.g., packets, or the like) via one or more communication protocols, such as, an Ethernet protocol, a high-performance computing (HPC) link-layer protocol, or the like.

Figure 2:
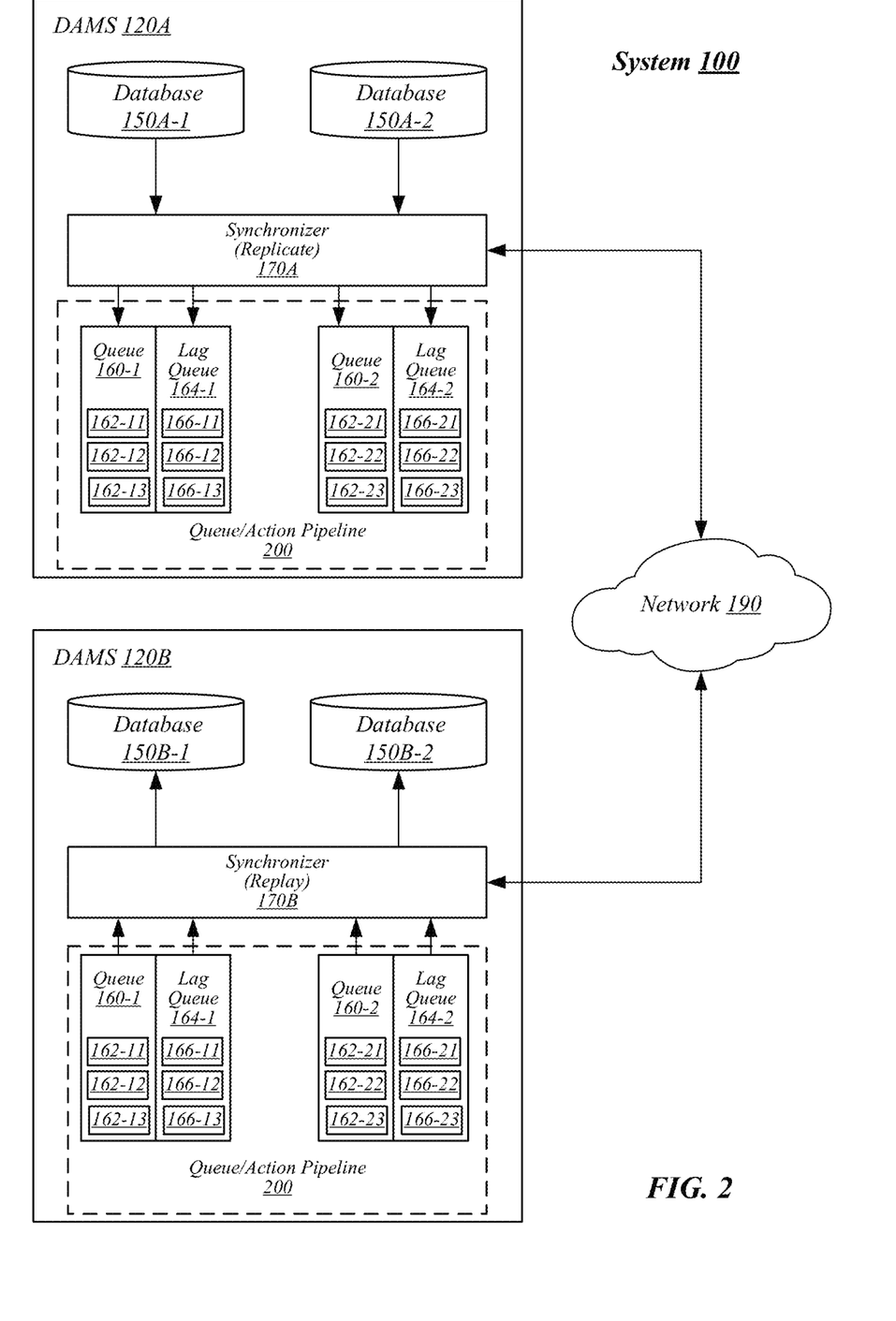
FIG. 2 illustrates the example system of FIG. 1 in alternative detail.

FIG. 2 illustrates a portion of the system 100 of FIG. 1 in greater detail. In particular, this figure depicts portions of DAMS 120A and DAMS 120B. It is noted, that DAMS 120A and 120B are only depicted with two databases each for purposes of clarity of presentation. However, as described above, the present disclosure can be provided to synchronize alternative DAMS deployment(s) with a primary DAMS deployment where each of the DAMS include any number of applications and/or databases to manage digital assets. For example, a DAMS 120A could be provided with a first database 150 (e.g., an SQL database, a NoSQL database, or the like) arranged as a "main database", a second database 150 (e.g., ElastiSearch database, or the like) arranged as a distributed index, audit log, and a Blob Store. Examples are not limited in this context.

DAMS 120A includes databases 150A-1 and 150A-2. During operation, DAMS 120A employs databases 150A-1 and 150A-2 to manage digital assets 130 (see FIG. 1). For example, during operation, DAMS 120A may receive indications of commands, operations, or queries, all generally referred to as "actions" to execute on the database 150A-1 or the database 150A-2. These actions can originate from entities (e.g. users, a client application, or the like) external to the DAMS 120A or from within the DAMS 120A (e.g., from an application, or the like).

Synchronizer 170A receives an indication of these actions 162-*nm* and adds an indication of the actions 162-*nm* to appropriate queues 160-*n*. Additionally, synchronizer 170A generates timing information 166-*nm* (described in greater detail below) for each action 162-*nm*. Indications of this timing information 166-*nm* can be added to corresponding lag queues 164-*n* as depicted. As another example, the indication of timing information 166-*nm* can be added to the indication of the action 162-*nm*.

The queues 160-*n* and 164-*n* as well as the actions 162-*nm* and timing information 166-*nm* can form a queue/action pipeline 200, which is communicated (e.g., pipelined, or the like) from synchronizer 170A to synchronizer 170B. Synchronizer 170B is arranged to receive the queue/action pipeline 200, and interpret indications of actions 162-*nm* and replay (or cause to be executed) the actions 162-*nm* on the appropriate database 150B-1 or 150B-2 based on the queues 160-*n* in an order dictated by the timing information 166-*nm* from queues 164-*nm*. Thus, databases 150B-1 and 150B-2 can be synchronized with databases 150A-1 and 150A-2 to synchronize DAMS 120B with DAMS 120A.

With some examples, synchronizer 170A receives indications of the commands as they are sent to the database 150A to be executed (e.g., from a database client, or the like). For example, database 150A-1 may be an Elastisearch database. Synchronizer 170A can be arranged to receive indications of actions (e.g., indexing commands, or the like) from the Elastisearch client and (1) provide the indexing commands to the database 150A-1 to be executed by the database 150A-1 and (2) add an indication of the command 162-*nm* along with an indication of timing information 166-*nm* to the appropriate queues 160-*n* and 164-*n*. As another example, database 150A-2 may be a MongoDB database. Synchronizer 170A can be arranged to receive an operation log for the database 150A-2 and (1) parse meaningful actions from the operation log and (2) add an indication of the actions 162-*nm* along with an indication of timing information 166-*nm* to the appropriate queues 160-*n* and 164-*n*.

In some examples, synchronizer 170A can be arranged to wrap the actions (or indications of the actions) in a message and use a messaging pipeline to communicate the messages to synchronizer 170B. For example, synchronizer 170A can be arranged to implement queues 160-*n* and 164-*n* to communicate actions 162-*nm* and timing information 166-*nm* with Apache Kafka®. In such an example, synchronizer 170A can be arranged to wrap commands 162-*nm* (e.g., as received, as parsed from a log, or the like) in a Kafka message and add the messages to corresponding Kafka topics (or queue 162-*n*). Synchronizer 170A can also wrap timing information 166-*nm* in a Kafka message and add the messages to corresponding Kafka topics (or queue 164-*n*). The topics and messages can be pipelined from synchronizer 170A to synchronizer 170B via network 190.

It is to be appreciated, a number of actions 1620-*nm* may be replayed on DAMS 120B synchronously to synchronize DAMS 120B with DAMS 120A. However, in some examples, a set of actions 162-*nm* can be provided and asynchronously executed. For example, a set of actions 162-*nm* can be provided to convert a large video file, to index text documents, to import a number of digital assets 130 in bulk, or the like. This set of actions 162-*nm* can be executed asynchronously by DAMS 120A. However, for synchronization of DAMS 120B to DAMS 120A, the ones of the set of actions 162-*nm* which have already been executed must be accounted for. Thus, when the alternative DAMS 120B becomes the "primary DAMS" the ones of the set of actions 162-*nm* that have already been replayed by DAMS 120B will not be executed again. Accordingly, in some examples, synchronizer 170A can be arranged to provide an indication of a set of actions 162-*nm* (or a queue of actions 162-*nm*) to be asynchronously to synchronizer 170B. Synchronizer 170B can be arranged to track which actions 162-*nm* from the set of actions to be asynchronously executed have be replayed as detailed above. Thus, where DAMS 120B changes to operate as a primary DAMS, the queue of asynchronous actions can continue to be processed without repeating already played actions 162-*nm* from the queue.

Figure 3:
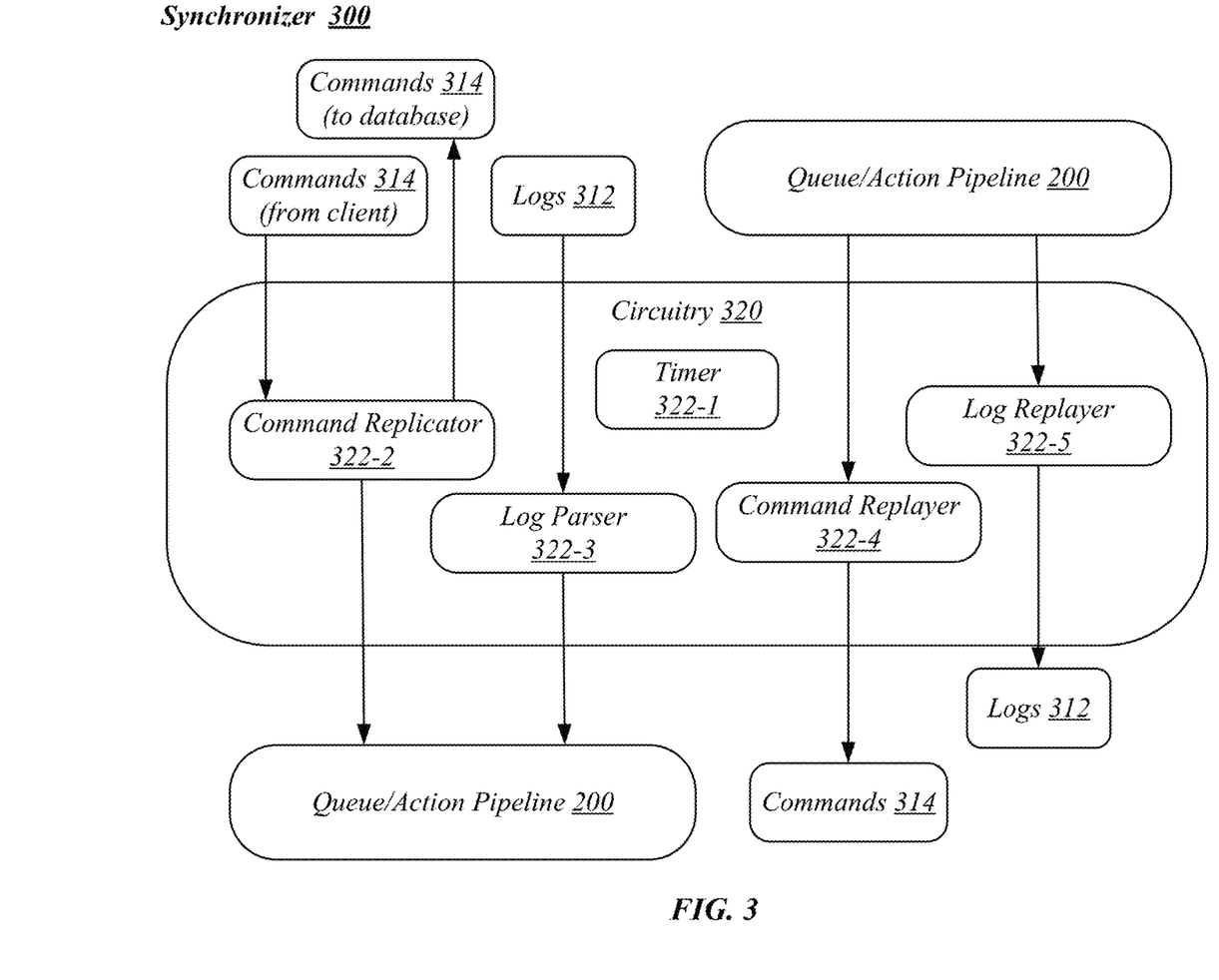
FIG. 3 illustrates an example synchronizer for a DAMS.

FIG. 3 illustrates an example block diagram for a synchronizer 300. Synchronizer 300 can be implemented as either synchronizer 170A or synchronizer 170B of FIGS. 1-2. Although synchronizer 300 shown in FIG. 3 has a limited number of elements in a certain topology, it may be appreciated that the synchronizer 300 may include more or less elements in alternate topologies as desired for a given implementation.

According to some examples, synchronizer 300 may be supported by hardware or circuitry 320 (e.g., processing resources 112, memory resources 114, or the like) of a data center, such as data center 110A/110B of FIG. 1. Circuitry 320 may be arranged to execute one or more sets of instructions (e.g., software or firmware implemented modules or components) 322-a, where a is any positive integer. These sets of instructions can be software/firmware stored in computer-readable media. Although the components are shown in FIG. 3 as discrete boxes, this does not limit these components to storage in distinct computer-readable media components (e.g., a separate memory, etc.).

Synchronizer 300 can include a timer 322-1. In general, timer 322-1 can determine timing information 166-nm for actions 162-nm within queue/action pipeline 200. For example, with some embodiments, timer 322-1 can determine timing information 166-nm based on a global clock, such as, an atomic clock or other clock accessible to all data centers 110 where the DAMS 120 to be synchronized are deployed. In some examples, timer 322-1 determines timing information 166-nm based on an order of operations or order of execution for actions 162-nm. In some examples, timer 322-1 determines timing information based on a lag between execution of actions 162-nm. Examples are not limited in this context. In some examples, timer 322-1 determines timing information 166-nm based on a sequence number (e.g., as generated by database 150A-1, database 150A-2, or the like). In some examples, timer 322-1 determines timing information 166-nm based on offset number of the source queue for the master message. In some examples, timer 322-1 determines timing information 166-nm based on the operation log (e.g., log 312, or the like).

Synchronizer 300 can include a command replicator 322-2 arranged to receive commands 314 and (1) add the command 314 along with indications of timing information to the queue/action pipeline 200 and (2) assert the command 314 on the appropriate sub-system of the DAMS in which the synchronizer 300 is employed (e.g., assert the commands 314 to a database 150, assert the command to an application 140, or the like).

Synchronizer 300 can include a log parser 322-3 arranged to receive logs 312 and add actions along with indications of timing information to the queue/action pipeline 200 based on the logs 312. In some examples, the operation log (e.g., logs 312 can include a transaction identification (ID), which may indicate whether the transaction has been committed. Accordingly, log parser 322-3 can be arranged to parse or identify only committed actions 162-nm from the logs 312. Thus, only actions 162-nm that were actually committed to the database may be replayed.

With some examples, synchronizer 300 can include any number and combination of command replicators 322-2 and log parsers 322-3. For example, for a DAMS with an Elastisearch database and MongoDB as described above, circuitry 320 may include a command replicator arranged to couple to the Elastisearch client as described and a log parser 322-3 arranged to receive operation logs from the MongoDB as described. As a further example, circuitry 320 could include an additional log parser to receive operation logs from another database, such as, an SQL database and add indications of actions and associated timing information for the SQL database to the queue/action pipeline 200 based on the logs received from the SQL database. With some examples, a separate command replicator 322-2 or log parser 322-3 can be provided for each type and/or configuration of application 140 or database 150 of the DAMS 120. For example, a command replicator 322-2 or log parser 322-3 can be provided to couple to the application 140 or database 150 via an application programming interface (API) for the application 140 or database 150.

Synchronizer 300 can include a command replayer 322-4 arranged to access queue/action pipeline 200 and replay (or cause to be executed) commands from queue/action pipeline 200 on appropriate applications 140 or databases 150 and in an order dictated by timing information. Synchronizer 300 can include a log replayer 322-5 arranged to recreate logs 312 from queue/action pipeline 200 and cause an appropriate application 140 or database 150 to be updated or synchronized using the recreated logs 312.

Figure 4:
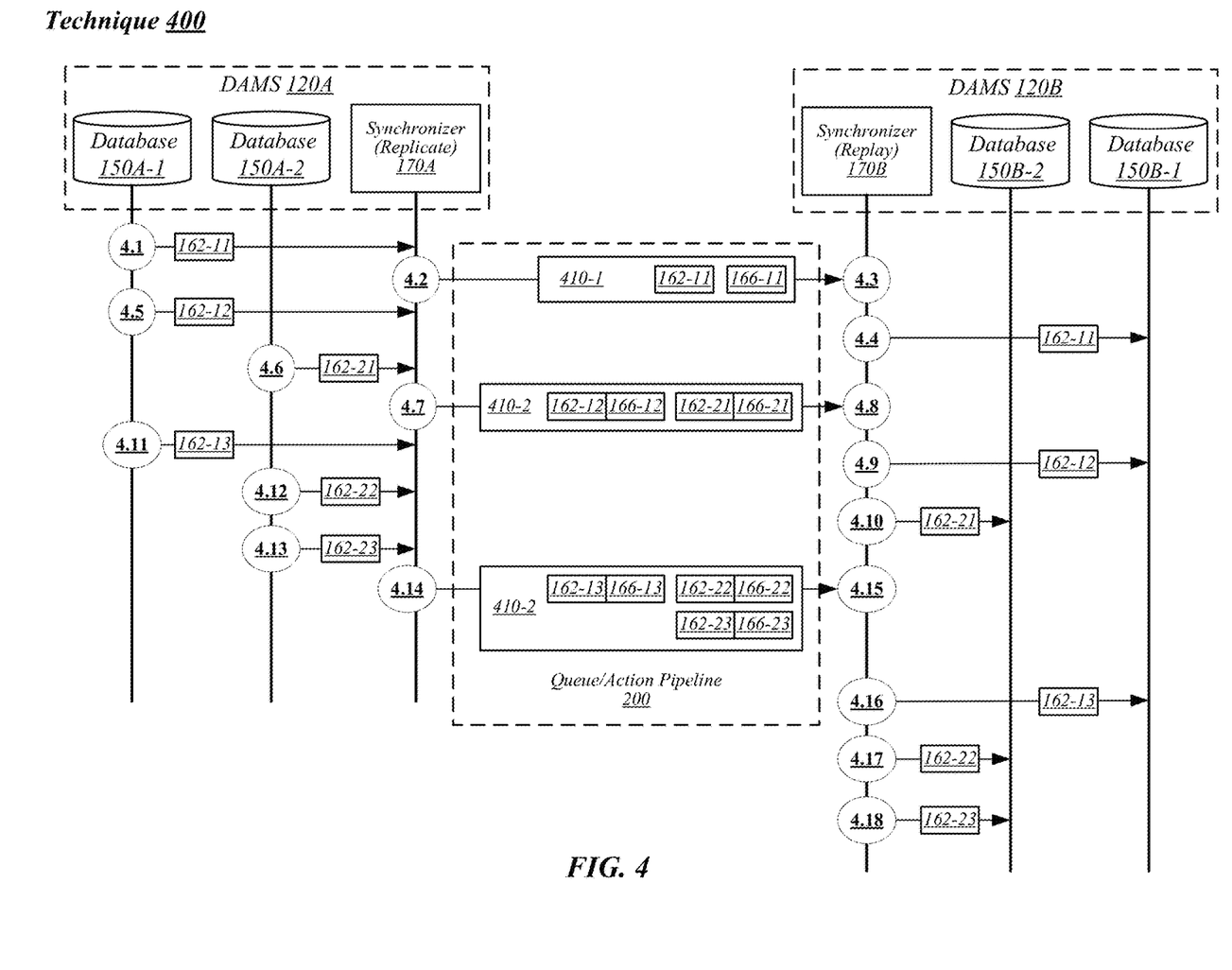
FIG. 4 illustrates an example technique to synchronize DAMS deployments.

FIG. 4 illustrates an example technique 400 for synchronizing DAMS deployment(s) with a primary DAMS deployment. Technique 400 is described with reference to the DAMS 120A and 120B as depicted in FIG. 2 and particularly to the queue/action pipeline 200 of this figure. However, it is noted, the techniques could be implemented to synchronize DAMS deployment(s) with a primary DAMS deployment in any configuration of DAMS. This figure makes clear, that actions 162-nm executed on DAMS 120A are replayed in the same order on DAMS 120B. The ordering is maintained regardless of the source. Said differently, the ordering of actions across all sources (e.g., databases 150A and 150B, or the like) is maintained or preserved to replay the actions in the original ordering.

Technique 400 can begin at circle 4.1. At circle 4.1, database 150A-1 can execute action 162-11 and synchronizer 170A can receive an indication of action 162-11. In some examples, synchronizer 170A can receive indications of action 162-11 from an operation log for database 150A-1. In some examples, synchronizer 170A can receive indications of action 162-11 directly from a client for database 150A-1.

Continuing to circle 4.2, synchronizer 170A can provide an indication of action 162-11 and timing information 166-11 for action 162-11 to synchronizer 170B. In some examples, synchronizer 170A can send an information element 410-1 including indications of action 162-11 and timing information 166-11 to synchronizer 170B for each action (e.g. as depicted at block 4.2). With some examples, as detailed above, synchronizer 170A can wrap the action 162-11 and/or timing information 166-nm in a message (e.g., Kafka message, or the like) and add the messages to a queues 160-n/164-n (e.g., Kafka topic, or the like) in queue/action pipeline 200.

Continuing to circle 4.3, synchronizer 170B can receive information element 410-1 (e.g., can access queue/action pipeline 200, or the like) to receive indications of action 162-11 and timing information 166-11. Continuing to block 4.4, synchronizer 170B can replay (e.g., cause to be executed, or the like) action 162-11 on DAMS 120B. For example, synchronizer 170B can assert action 162-11 to database 150B-1 in an order (e.g., first, or the like) dictated by timing information 166-11.

The above process can be repeated as actions executed on DAMS 120A are added to queue/action pipeline 200 and then replayed, in an appropriate order and timing, on DAMS 120B. For example, continuing to circle 4.5 database 150A-1 can execute action 162-12. At circle 4.6, database 150A-2 can execute action 162-21. At circle 4.7, synchronizer 170A can add indications of actions 162-12 and 162-21 along with associated timing information 166-12 and 166-21 to queue/action pipeline 200 (e.g., for example, via information element 410-2, via Kafka messaging, or the like). At circle 4.8, synchronizer 170B can receive indications of actions 162-12 and 162-21 as well as associated timing information 166-12 and 166-21 from queue/action pipeline 200. At circle 4.9 and at circle 4.10, synchronizer 170B can cause actions 162-12 and 162-21 to be replayed on DAMS 120B in an order dictated by timing information 166-12 and 166-21. For example, actions 162-12 is executed on database 150B-1 prior to action 162-21 being executed on database 150B-2.

At circles 4-11, 4.12 and 4.13, synchronizer 170A receives indications of actions 162-13, 162-22 and 162-23. At circle 4.14, synchronizer 170A adds indications of actions 162-13, 162-22 and 162-23 and associated timing information 166-13, 166-22 and 166-23 to queue/action pipeline 200 (e.g., via information element 410-3, via Kafka messaging, or the like).

At circle 4.15, synchronizer 170B receives indications of actions 162-13, 162-22 and 162-23 from queue/action pipeline 200. At circles 4.16, 4.17 and 4.18, synchronizer 170B replays actions 162-13, 162-22 and 162-23 in an order dictated by timing information 166-13, 166-22 and 166-23.

Thus, actions executed on DAMS 120A can be replayed on DAMS 120B in the same order as executed on DAMS 120A to synchronize DAMS 120B to DAMS 120A.

Figure 5:
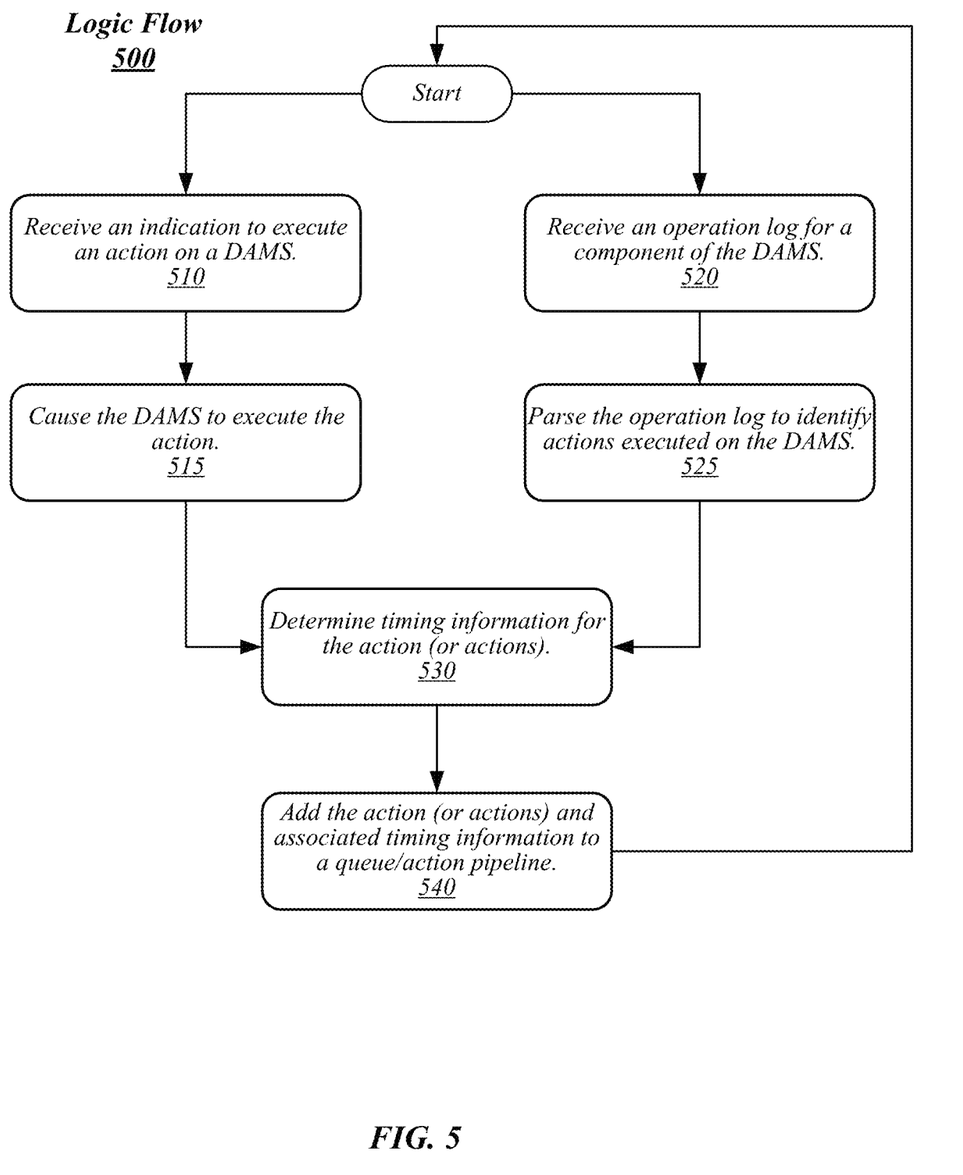
FIG. 5 illustrates a first example logic flow.
Figure 6:
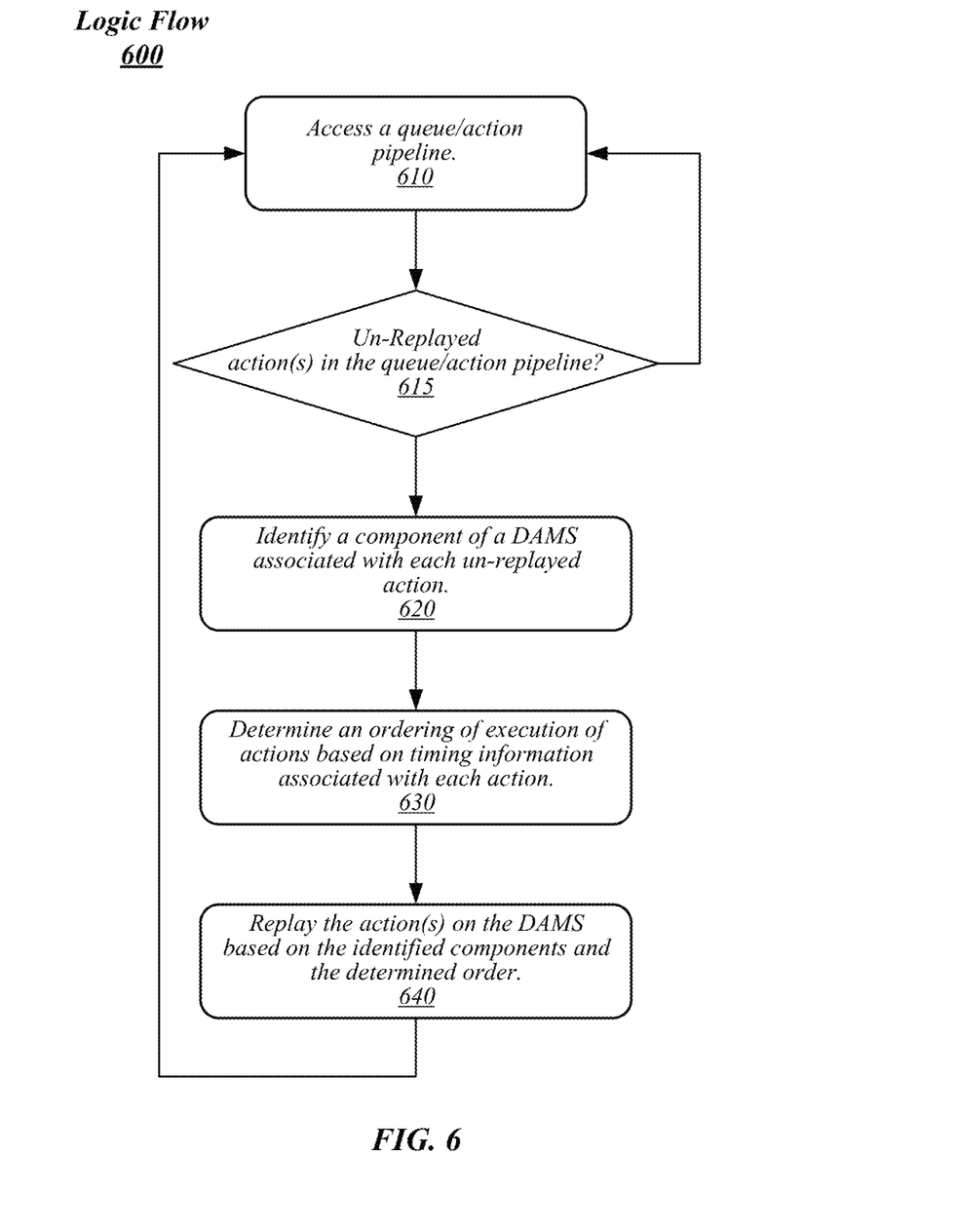
FIG. 6 illustrates a second example logic flow.

FIGS. 5-6 depict example logic flows. These logic flows are representative of example methodologies for performing aspects of the disclosed architecture. While, for purposes of simplicity of explanation, the methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as, in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Turning to FIG. 5, which illustrates an example logic flow 500. Logic flow 500 may be representative of some or all of the operations executed by one or more logic, features, or devices described herein, such as synchronizer 170A, synchronizer 300, or the like. More particularly, logic flow 500 may be implemented by at least a primary DAMS implementations 102A to synchronize DAMS 120A deployed on data center 110A with alternative DAMS implementation(s) 102B and DAMS 120B deployed on data center 110B.

Logic flow 500 can begin at either of blocks 510 or 520. More specifically, logic flow 500 can be arranged to provide indications of actions and associated timing information for a number of sub-systems (e.g., applications 140, databases 150, or the like) of a primary DAMS to an alternative DAMS which is to be synchronized to the primary DAMs. Thus, logic flow 500 can begin and move through different pathways to provide such information. It is not necessary that block 510 be performed prior to block 520. Furthermore, in some examples, blocks 510 and 520 can be performed concurrently.

At block 510 "receive an indication to execute an action on a DAMS" a DAMS synchronizer can receive an indication to execute an action on the DAMS. For example, synchronizer 170A can receive (e.g., from a client for database 150A-1, or the like) an indication to execute an action (e.g., create a record, or the like) on the DAMS 120A. Continuing to block 515 "cause the DAMS to execute the action" the DAMS synchronizer can cause the DAMS to execute the action. For example, the synchronizer 170A can forward the command from the client to the database 150A-1 to cause the action 162-$nm$ to be executed by database 150A-1 of DAMS 120A.

At block 520 "receive an operation log for a component of the DAMS" a DAMS synchronizer can receive an operation log for a component or sub-system of the DAMS. For example, synchronizer 170A can receive an operation log (e.g., for database 150A-2, or the like). Continuing to block 525 "parse the operation log to identify actions execute on the DAMS" the DAMS synchronizer can parse the received operation log to identify actions executed on the DAMS. For example, synchronizer 170A can parse operation log for database 150A-2 and identify actions 162-$nm$ executed by database 150A-2 of DAMS 120A.

From blocks 515 and 525, the logic flow 500 can continue to block 530. At block 530 "determine timing information for the action (or actions)" the DAMS synchronizer can determine timing information for the action or action (e.g., action(s) from block 515/525). For example, synchronizer 170A can determine timing information 166-$nm$ for actions 162-$nm$.

Continuing to block 535 "add the action (or actions) and associated timing information to a queue/action pipeline" synchronizer for the DAMS can add indications of the actions and associated timing information to a queue/action pipeline. For example, synchronizer 170A can add indications of action(s) 162-$nm$ and timing information 166-$nm$ to queue/action pipeline 200. Logic flow 500 can be repeated (e.g., periodically, continually, or the like) to populate queue/action pipeline 200 with actions 162-$nm$ and timing information 166-$nm$ to facilitate the continual synchronization of DAMS 120B to DAMS 120A.

Turning to FIG. 6, which illustrates an example logic flow 600. Logic flow 600 may be representative of some or all of the operations executed by one or more logic, features, or devices described herein, such as synchronizer 170B, synchronizer 300, or the like. More particularly, logic flow 600 may be implemented by at least an alternative DAMS implementation 102B to synchronize DAMS 120B deployed on data center 110B with a primary DAMS implementation 102A and DAMS 120A deployed on data center 110A.

Logic flow 600 may begin at block 610. At block 610 "access a queue/action pipeline" a synchronizer of an alternative DAMS deployment can access a queue/action pipeline. For example, synchronizer 170B of DAMS 120B can access queue/action pipeline 200. Continuing to decision block 615 "un-replayed action(s) in the queue/action pipeline?" the synchronizer can determine whether there are any un-replayed actions in the queue/action pipeline. Said differently, synchronizer 170B can determine whether any actions 162-$nm$ from queue/action pipeline 200 have not been replayed on DAMS 120B. From decision block 615, logic flow 600 can return to block 610 or continue to block 620. For example, logic flow 600 can return to block 610 from decision block 615 based on a determination that there are not un-replayed actions in the queue/action pipeline. Alternatively, logic flow 600 can continue to block 620 from decision block 615 based on a determination that there are un-replayed actions in the queue/action pipeline.

At block 620 "identify a component of a DAMS associated with each un-replayed action" the synchronizer can determine which DAMS components (e.g., applications 140, databases 150, or the like) are associated with each un-replayed action. For example, synchronizer 170B can determine which components (e.g., database 150A, database 150B, or the like) are associated with each un-replayed action 162-nm from the queue/action pipeline 200.

Continuing to block 630 "determine an ordering of execution of actions based on timing information associated with each action" the DAMS synchronizer can determine an ordering of execution for un-replayed actions in the queue/action pipeline based on timing information associated with the un-replayed actions. For example, synchronizer 170B can determine an execution order, or an order to replay, actions 162-nm based on timing information 166-nm.

Continuing to block 640 "replay the action(s) on the DAMS based on the identified components and the determined order" the synchronizer can replay, or cause to be executed, un-replayed actions in the order dictated by timing information 166-nm. For example, synchronizer 170B can replay, or cause to be executed on DAMS 120B, actions 162-nm in the order dictated by timing information 166-nm to synchronize DAMS 120B to DAMS 120A. Logic flow 600 can be repeated (e.g., periodically, continually, or the like) to capture un-replayed actions 162-nm from queue/action pipeline 200 and replay the actions 162-nm on DAMS 120B (based on timing information 166-nm) to facilitate the continual synchronization of DAMS 120B to DAMS 120A.

Figure 7:
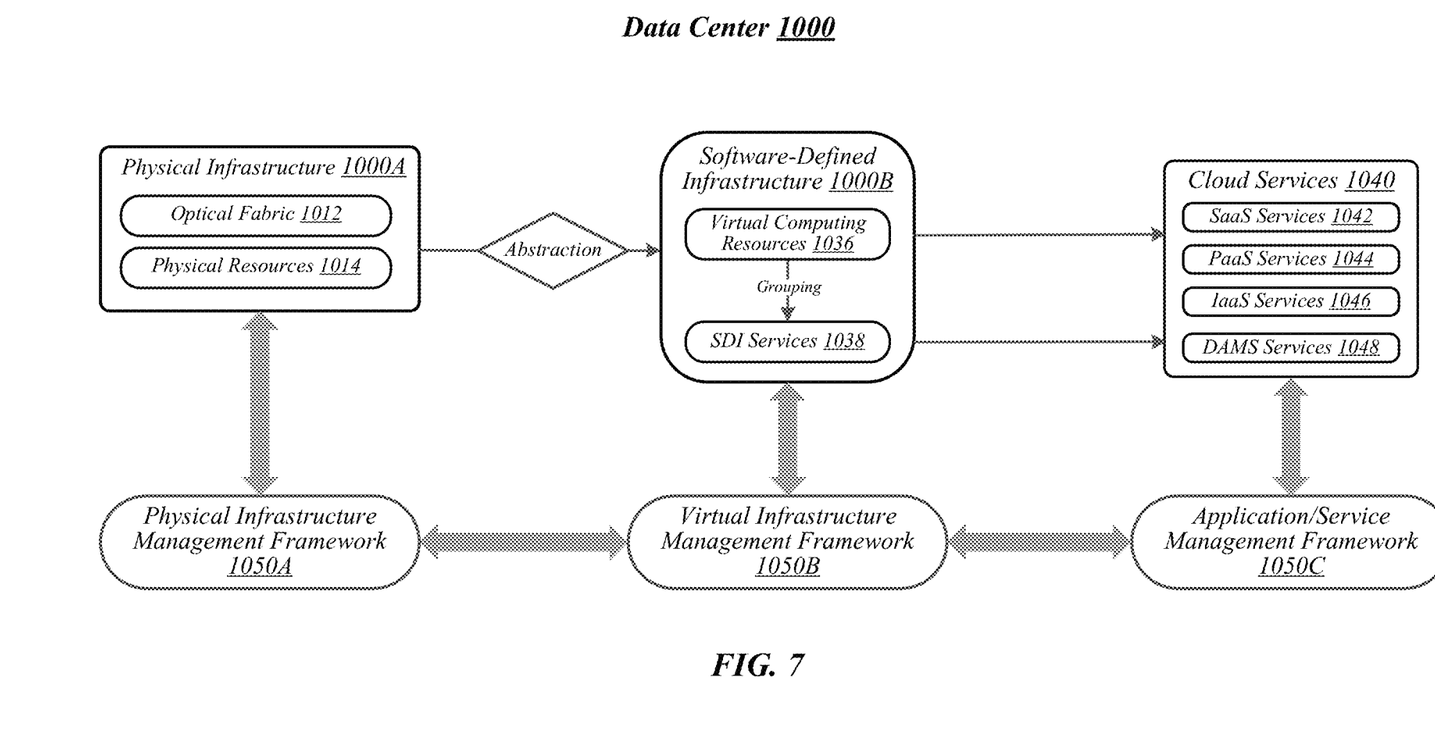
FIG. 7 illustrates an example data center.

FIG. 7 illustrates an example of a data center 1000 that may generally be representative of a data center on which one or more techniques described herein may be implemented according to various embodiments. As reflected in this figure, a physical infrastructure management framework 1050A may be implemented to facilitate management of a physical infrastructure 1000A of data center 1000. In various embodiments, one function of physical infrastructure management framework 1050A may be to manage maintenance functions within data center 1000. In some embodiments, physical infrastructure 1000A may feature an advanced telemetry system that performs telemetry reporting that is sufficiently robust to support remote management of physical infrastructure 1000A.

As depicted, the physical infrastructure 1000A of data center 1000 may comprise an optical fabric 1012 to provide connectivity among physical resources 1014. In some examples, physical resources 1014 can include processors, memory, storage, and networking interconnects.

In various embodiments, one or more layers of abstraction may be applied to the physical resources 1014 of physical infrastructure 1000A in order to define a virtual infrastructure, such as a software-defined infrastructure 1000B. In some embodiments, virtual computing resources 1036 of software-defined infrastructure 1000B may be allocated to support the provision of cloud services 1040. In various embodiments, particular sets of virtual computing resources 1036 may be grouped for provision to cloud services 1040 in the form of SDI services 1038. Examples of cloud services 1040 may include—without limitation—software as a service (SaaS) services 1042, platform as a service (PaaS) services 1044, infrastructure as a service (IaaS) services 1046, and digital asset management service (DAMS) services 1048.

In some embodiments, management of software-defined infrastructure 1000B may be conducted using a virtual infrastructure management framework 1050B. In various embodiments, virtual infrastructure management framework 1050B may be designed to implement workload fingerprinting techniques and/or machine-learning techniques in conjunction with managing allocation of virtual computing resources 1036 and/or SDI services 1038 to cloud services 1040. In some embodiments, virtual infrastructure management framework 1050B may use/consult telemetry data in conjunction with performing such resource allocation. In various embodiments, an application/service management framework 1050C may be implemented in order to provide QoS management capabilities for cloud services 1040.

Figure 8:
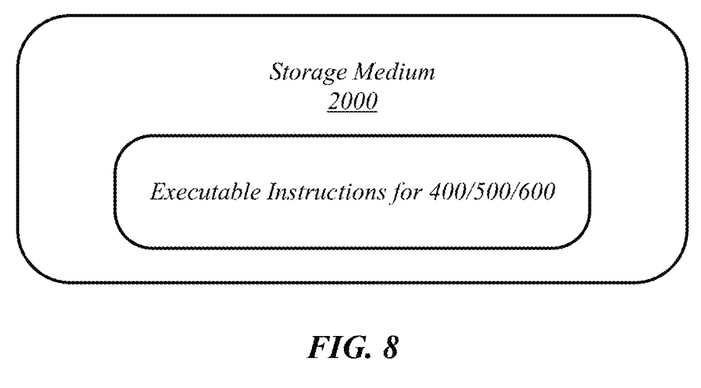
FIG. 8 illustrates an example of a storage medium.

FIG. 8 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement technique 400, logic flow 500, and/or logic flow 600. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
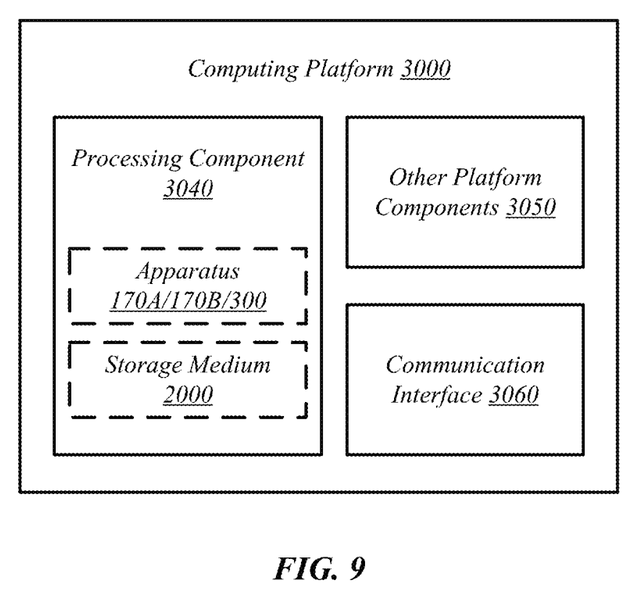
FIG. 9 illustrates an example computing platform.

FIG. 9 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may execute processing operations or logic for apparatus (e.g., synchronizer, or the like) 170A/170B/300 and/or storage medium 2000. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

The invention claimed is:

1. A system comprising:
a first content management system (CMS) deployed on a first data center, the first CMS comprising a set of instructions stored in memory of the first data center, the first CMS comprising a first database and a second database, the set of instructions when executed by a processor of the first data center, cause the processor of the first data center to:
receive an operation log for the first database;
identify one or more first actions from the operation log;
associate the identified one or more first actions with the first database;
receive at least one second action to execute on the second database;
cause the second database to execute the at least one second action;
associate the at least one second actions with the second database;
determine, based on a global clock accessible to the first data center and a second data center, relative timing information for each of the one or more first actions and the at least one second action;
wrap an indication of each of the one or more first actions in a first message;
add the first message to a first queue of a queue/action pipeline;
populate a first lag queue of the queue/action pipeline with indications of the determined relative timing information for the one or more first actions to define an order of execution of the one or more first actions, the first lag queue separate from the first queue, wherein the relative timing information and the order of execution of the one or more first actions is not stored in the first queue, wherein the relative timing information and the order of execution of the one or more first actions in the first lag queue is determined based on the first queue;
wrap an indication of the at least one second action in a second message;
add the second message to a second queue of the queue/action pipeline; and
populate a second lag queue of the queue/action pipeline with indications of the determined relative timing information for the at least one second action to define an order of execution of the at least one second action, the second lag queue separate from the second queue, wherein the relative timing information and the order of execution of the at least one second action is not stored in the second queue, wherein the relative timing information and the order of execution of the at least one second action in the second lag queue is determined based on the second queue; and
a second CMS deployed on the second data center and communicatively coupled to the first CMS, the second CMS comprising a set of instructions stored in memory of the second data center, the second CMS comprising a third database and a fourth database, the set of instructions when executed by a processor of the second data center, cause the processor of the second data center to:
identify the one or more first actions from the first queue of the queue/action pipeline based on the first message;
identify the at least one second action from the second queue of the queue/action pipeline based on the second message;
identify the order of execution of the one or more first actions and the order of execution of the at least one second action defined in the first lag queue and the second lag queue of the queue/action pipeline, respectively; and
cause the third database to execute the one or more first actions and the fourth database to execute the at least one action in an order corresponding to the identified orders of execution, wherein the at least one second action comprises converting a first file in the second and fourth databases from a first file format to a second file format.

2. The system of claim 1, wherein the first CMS comprises a primary CMS and wherein the second CMS comprises an alternative CMS.

3. The system of claim 2, the second CMS comprising instructions which when executed by the processor of the second data center, cause the processor of the second data center to:

determine that the second CMS is the primary CMS due to a failure of the first CMS;

determine, by the second CMS, that a first action of the one or more first actions has been performed on the third database by the first CMS;

refrain, by the second CMS, from performing a second instance of the first action of the one or more actions on the third database;

determine, by the second CMS, that a third action of the one or more first actions has not been performed on the third database; and perform, by the second CMS, the third action on the third database.

4. The system of claim 1, wherein the indications of the relative timing information for the one or more first actions in the first lag queue are wrapped in a third message, wherein the indications of the relative timing information for the one or more second actions in the second lag queue are wrapped in a fourth message.

5. A method for a content management system (CMS) comprising:

receiving an operation log for a first database of a first content management system (CMS);

identifying one or more first actions from the operation log;

associating the identified one or more first actions with the first database of the first CMS;

receiving at least one second action to execute on a second database of the first CMS;

causing the second database to execute the at least one second action;

associating the at least one second actions with the second database;

determining, based on a global clock accessible to the first CMS and a second CMS, relative timing information for each of the one or more first actions and the at least one second action;

wrapping an indication of each of the one or more first actions in a first message;

adding the first message to a first queue of a queue/action pipeline;

populating a first lag queue of the queue/action pipeline with indications of the determined relative timing information for the one or more first actions to define an order of execution of the one or more first actions, the first lag queue separate from the first queue, wherein the relative timing information and the order of execution of the one or more first actions is not stored in the first queue, wherein the relative timing information and the order of execution of the one or more first actions in the first lag queue is determined based on the first queue;

wrapping an indication of the at least one second action in a second message;

adding the second message to a second queue of the queue/action pipeline;

populating a second lag queue of the queue/action pipeline with indications of the determined relative timing information for the at least one second action to define an order of execution of the at least one second action, the second lag queue separate from the second queue, wherein the relative timing information and the order of execution of the at least one second action is not stored in the second queue, wherein the relative timing information and the order of execution of the at least one second action in the second lag queue is determined based on the second queue; and providing access to the queue action pipeline to the second CMS to be synchronized to the first CMS, the second CMS to execute the one or more first actions on a third database of the second CMS and the at least one second action on a fourth database of the second CMS in according to the orders of execution defined in the first lag queue and the second lag queue, respectively, to synchronize the second CMS to the first CMS, wherein the at least one second action comprises converting a first file in the second and fourth databases from a first file format to a second file format.

6. The method of claim 5, wherein the indications of the relative timing information for the one or more first actions in the first lag queue are wrapped in a third message, wherein the indications of the relative timing information for the one or more second actions in the second lag queue are wrapped in a fourth message.

7. One or more non-transitory computer readable storage mediums comprising instructions, which when executed by a processor of a first content management system (CMS), cause the processor to:

receive an operation log for a first database of the first CMS;

identify one or more first actions from the operation log;

associate the identified one or more first actions with the first database;

receive at least one second action to execute on a second database of the first CMS;

cause the second database to execute the at least one second action;

associate the at least one second actions with the second database;

determine, based on a global clock accessible to a first data center and a second data center, relative timing information for each of the one or more first actions and the at least one second action, the first CMS deployed on the first data center, a second CMS deployed on the second data center;

wrap an indication of each of the one or more first actions in a first message;

add the first message to a first queue of a queue/action pipeline;

populate a first lag queue of the queue/action pipeline with indications of the determined relative timing information for the one or more first actions to define an order of execution of the one or more first actions, the first lag queue separate from the first queue, wherein the relative timing information and the order of execution of the one or more first actions is not stored in the first queue, wherein the relative timing information and the order of execution of the one or more first actions in the first lag queue is determined based on the first queue;

wrap an indication of the at least one second action in a second message;

add the second message to a second queue of the queue/action pipeline;

populate a second lag queue of the queue/action pipeline with indications of the determined relative timing information for the at least one second action to define an order of execution of the at least one second action, the second lag queue separate from the second queue, wherein the relative timing information and the order of execution of the at least one second action is not stored in the second queue, wherein the relative timing information and the order of execution of the at least one second action in the second lag queue is determined based on the second queue; and providing access to the queue action pipeline to the second CMS to be synchronized to the first CMS, the second CMS to execute the one or more first actions on a third database of the second CMS and the at least one second action on a fourth database of the second CMS in according to the orders of execution defined in the first lag queue and the second lag queue, respectively, to synchronize the second CMS to the first CMS, wherein the at least one second action comprises converting a first file in the second and fourth databases from a first file format to a second file format.

8. One or more non-transitory computer readable storage mediums comprising instructions, which when executed by a processor of a second content management system (CMS), cause the processor to:

access a queue/action pipeline populated by a first CMS, the queue/action pipeline comprising at least a first queue and an associated first lag queue and a second queue and an associated second lag queue, the first lag queue separate from the first queue, the second lag queue separate from the second queue;

identify indications of one or more first actions €r-em wrapped in a first message in the first queue of the queue/action pipeline, the one or more first actions of actions associated with a first database of the first CMS;

identify indications of at least one second action from wrapped in a second message in the second queue of the queue/action pipeline, the at least one second action associated with a second database of the first CMS;

identify an order of execution of the one or more first actions and an order of execution of the at least one second action defined based on relative timing information from the first lag queue and the second lag queue of the queue/action pipeline, respectively, the relative timing information for the one or more first actions not stored in the first queue, the relative timing information for the at least one second action not stored in the second queue, the relative timing information from the first and second lag queues based on a global clock accessible to the first CMS and the second CMS, wherein the relative timing information for the one or more first actions in the first lag queue is determined based on the first queue, wherein the relative timing information for the at least one second action in the second lag queue is determined based on the second queue; and cause a third database of the second CMS to execute the one or more first actions and a fourth database of the second CMS to execute the at least one action in orders corresponding to the orders defined in the first and second lag queues, respectively, wherein the at least one second action comprises converting a first file in the second and fourth databases from a first file format to a second file format.

9. The one or more non-transitory computer readable storage mediums of claim 8, the instructions when executed by the processor, cause the processor to retrieve a plurality of messages from the queue/action pipeline, the plurality of messages comprising at least the first message and the second message.

10. The one or more non-transitory computer readable storage mediums of claim 8, wherein the indications of the relative timing information for the one or more first actions in the first lag queue are wrapped in a third message, wherein the indications of the relative timing information for the one or more second actions in the second lag queue are wrapped in a fourth message.

11. The method of claim 5, wherein the first CMS comprises a primary CMS and wherein the second CMS comprises an alternative CMS.

12. The method of claim 11, the method comprising:
determining that the second CMS is the primary CMS due to a failure of the first CMS;
determining, by the second CMS, that a first action of the one or more first actions has been performed on the third database by the first CMS;
refraining, by the second CMS, from performing a second instance of the first action of the one or more actions on the third database;
determining, by the second CMS, that a third action of the one or more first actions has not been performed on the third database; and
performing, by the second CMS, the third action on the third database.

13. The one or more non-transitory computer readable storage mediums of claim 8, wherein the first CMS comprises a primary CMS and wherein the second CMS comprises an alternative CMS.

14. The one or more non-transitory computer readable storage mediums of claim 13, the instructions when executed by the processor, cause the processor to:
determine that the second CMS is the primary CMS due to a failure of the first CMS;
determine that a first action of the one or more first actions has been performed on the third database by the first CMS;
refrain from performing a second instance of the first action of the one or more actions on the third database;
determine that a third action of the one or more first actions has not been performed on the third database; and
perform the third action on the third database.

* * * * *